UNITED STATES PATENT OFFICE.

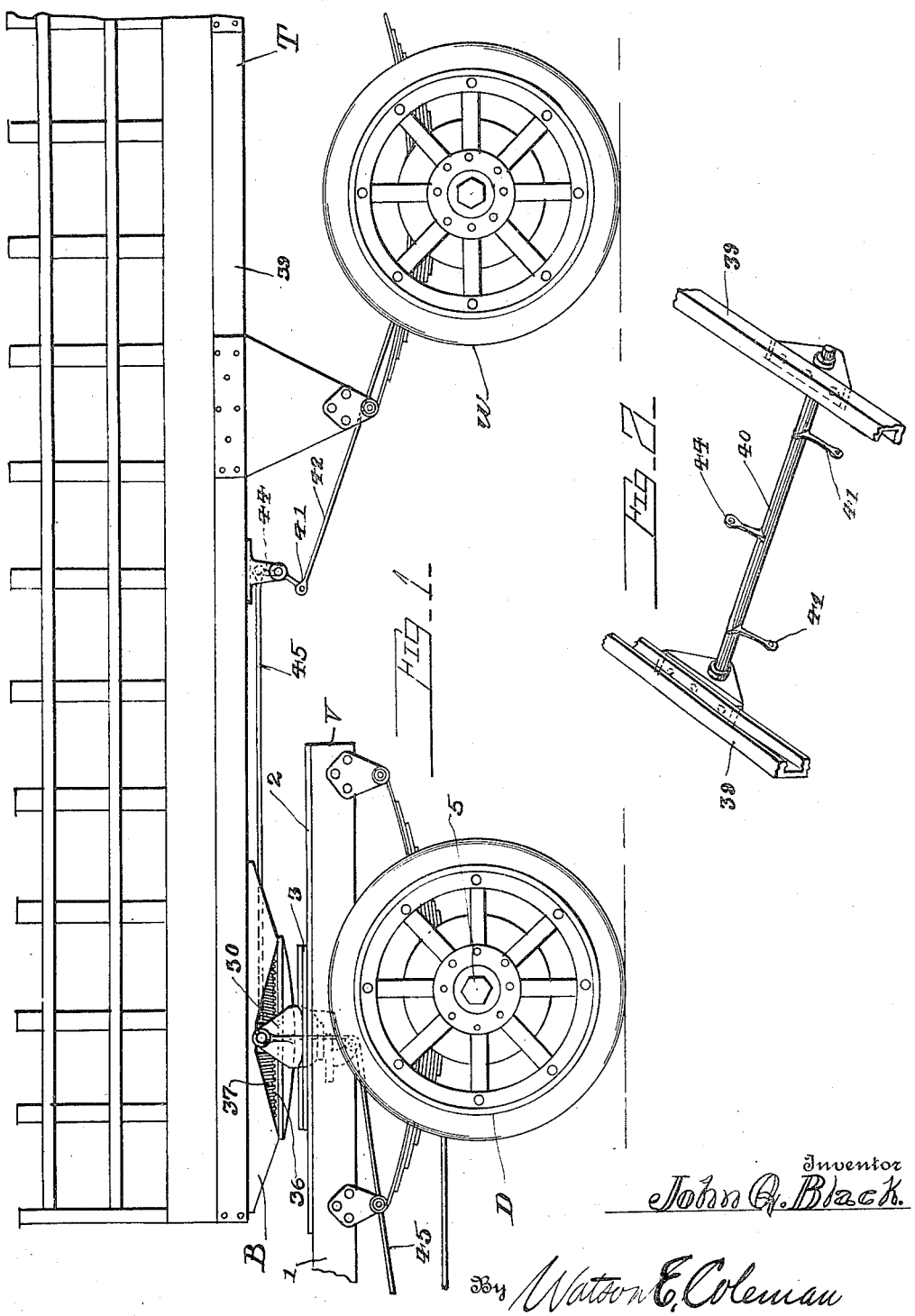

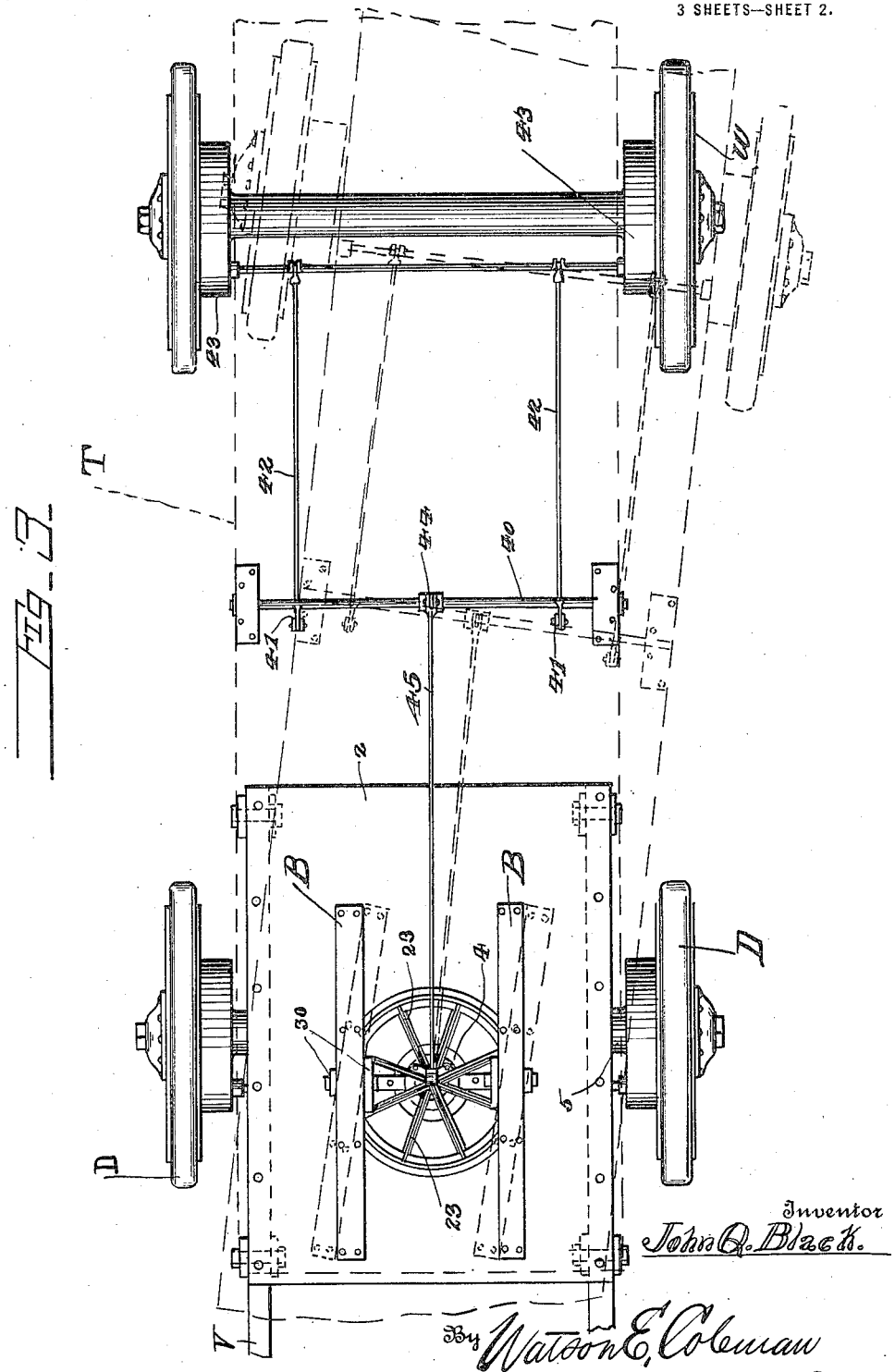

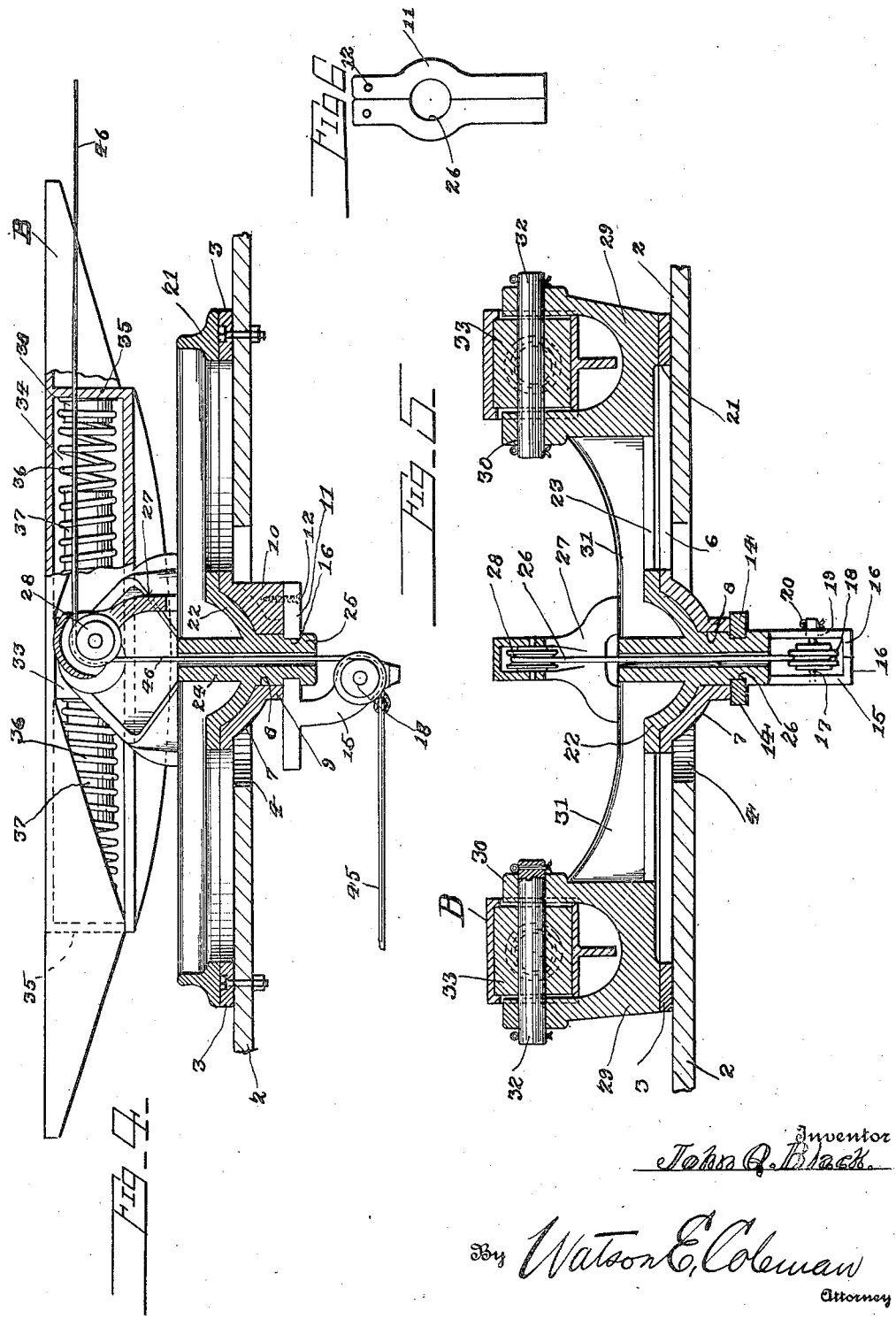

JOHN Q. BLACK, OF NASHVILLE, TENNESSEE.

HITCH STRUCTURE.

1,398,312.   Specification of Letters Patent.   Patented Nov. 29, 1921.

Application filed September 13, 1920. Serial No. 409,876.

*To all whom it may concern:*

Be it known that I, JOHN Q. BLACK, a citizen of the United States, residing at Nashville, in the county of Davidson and State of Tennessee, have invented certain new and useful Improvements in Hitch Structures, of which the following is a specification, reference being had to the accompanying drawings.

This invention relates to certain improvements in hitch structures and has relation more particularly to a device of this general character especially designed and adapted for use in connection with a vehicle and a trailer, and it is an object of the invention to provide a device of this general character embodying novel and improved means whereby the trailer is permitted to have vertical swinging movement irrespective of the position of its longitudinal axis relative to the corresponding axis of the vehicle and whereby, at the same time, the trailer is effectively supported against lateral swinging or tilting movement.

Another object of the invention is to provide a device of this general character embodying novel and improved means whereby the brakes of the vehicle and the brakes of the trailer may be operated simultaneously and wherein such operation of the brakes may be had at all times irrespective of the position of the trailer relative to the vehicle.

An additional object of the invention is to provide a novel and improved device of this general character whereby the supporting wheels of the trailer, and particularly a semi-trailer, have direct contact with a supporting surface irrespective of any inequalities or unevenness in such surface and irrespective of the lateral positions of the trailer relative to the vehicle.

The invention consists in the details of construction and in the combination and arrangement of the several parts of my improved hitch structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a hitch structure arranged in accordance with an embodiment of my invention and in assembled relation, the coacting portion of the main vehicle being shown in fragment.

Fig. 2 is a fragmentary view in perspective illustrating the brake shaft carried by the trailer.

Fig. 3 is a view in bottom plan of the structure illustrated in Fig. 1, the body of the trailer being diagrammatically indicated by dotted lines, a second position of the trailer being also indicated by dotted lines.

Fig. 4 is an enlarged fragmentary view partly in section and partly in elevation of my improved hitch structure.

Fig. 5 is a sectional view taken transversely through the structure illustrated in Fig. 4, and Fig. 6 is a diagrammatic view in bottom plan of the holding or locking arms in closed relation.

As disclosed in the accompanying drawings, 1 denotes the rear portions of the side beams of the frame or chassis of a motor driven vehicle and supported thereby is a platform 2. Suitably anchored to the platform 2 and resting thereon is a circular fifth wheel member 3. The member 3 is concentric to an opening 4 provided in the platform 2 at substantially the transverse center thereof and preferably at a point in advance of the rear supporting axle 5 of the vehicle.

Extending radially across the member 3 is a relatively broad elongated member or plate 6. The central portion 7 of the plate or member 6 is transversely enlarged and concavo-convex in form with its convex face downwardly disposed. This concavo-convex central portion 7 of the plate or member 6 extends through the opening 4 hereinbefore referred to. The central part of the portion 7 is provided with an opening 8 defined by a depending sleeve or barrel 9 of desired length. A portion of the wall of the sleeve 9 is of increased thickness to provide a block 10 having its under or lower face flat and flush with the lower or free end of the sleeve or barrel 9.

A pair of holding or locking arms 11 is carried by the block 10 and each of said arms is pivotally engaged, as at 12, with the lower or flat face of the block 10 so that the same may have swinging movement toward or from the axial center of the sleeve or barrel 9. The arms 11 are of a length to extend a desired distance beyond the opposite side of the sleeve or barrel 9 and an intermediate portion of each of said arms is provided with an outbow 14 for a purpose to be hereinafter more particularly referred to.

The end portion of each of the arms 11 remote from its pivotal connection 12 is provided with a depending arm 15. The lower or free end of the arm 15 terminates in an inwardly directed lug or flange 16. The flange 16 of one of the arms 15 contacts with the flange 16 of the second arm 15 to limit the relative inward movement of the arms 15. One of the arms 15 inwardly of its flange 16 carries a stub shaft 17 on which is loosely mounted a pulley 18. When the arms 15 are at the limit of their movement one toward the other, an end portion of the shaft 17 passes through an opening 19 provided in the second arm 15 and extends therebeyond. A cotter pin 20 or other removable member is inserted through the extended portion of the shaft 17 to provide means whereby the arms 11 are held in their holding or locking position yet readily permits the desired separating movement of the arms 11 when the occasions of practice so require.

21 denotes a second circular fifth wheel member adapted to rest upon the fifth wheel member 3. 22 denotes a concavo-convex member arranged at the axial center of the member 21 and operatively engaged therewith through the medium of the spokes 23. The convex face of the member 22 is downwardly disposed and is of a radius substantially equal to the radius of the convex face of the portion 7 of the plate or arm 6 so that when the member 21 is positioned upon the member 3, the concavo-convex member 22 will snugly fit within the concavo-convex central portion 7 of the plate or arm 6.

The member 22 at the axial center thereof is provided with the oppositely directed tubular members 24 and 25 having their bores in continuity and the member 25 is snugly disposed through the sleeve or barrel 9 and is of a length to terminate therebelow. The extended portion of the member 25 is provided in its periphery with an annular groove 26 which receives the inner marginal portions of the outbows 14 of the arms 11 when said arms are in locking or holding position and whereby the member 21 is effectively maintained in applied position after the cotter pin 20 or the like has been inserted through the extended end portion of the shaft 17 as hereinbefore referred to. The arms 11 coact with the member 25 in a manner to permit the member 21 to have unobstructed rotary movement with said member 25 as its axis of rotation.

Extending upwardly from the plate 22 at one side of the axial center thereof is a bracket 27 and rotatably supported by the upper portion of said bracket 27 is a pulley 28. When the member 21 is mounted upon the member 3 and the arms 11 are in holding or locking position, the inner or opposed bights of the pulleys 18 and 28 are in alinement with the bores of the tubular members 24 and 25.

The member 21 at diametrically opposed points and the outer end portions of adjacent pairs of spokes 23 have formed therewith the blocks 29 substantially chordal to the member 21. The blocks 29 are provided with the upstanding side plates 30. The inner plates 30 and the adjacent spokes 23 have integrally formed therewith the reinforcing webs 31 which are also integrally formed with the member or plate 22 and the upstanding tubular member 24 whereby the member 21 and the parts carried thereby are assembled in a manner to possess a maximum of strength.

Bridging the space between the plates 30 of each block 29 is a removable pin 32 which is also loosely directed through a block 33 whereby said block is supported for swinging movement about the pin. Each of the blocks 33 is snugly engaged within a longitudinally disposed guide slot 34 disposed transversely through a bolster B. Interposed between the end walls 35 of the slot 34 and the opposed end faces of the block 33 are the expansible members 36 herein disclosed as coil springs and whereby the bolster B is normally maintained with the block 33 at substantially the longitudinal center thereof. The end faces of the block 33 are provided with the outstanding cylindrical arms 37 each of which is encircled by an end portion of the member 36 while the opposite end portion of said member encircles an inwardly disposed boss 38 carried by the adjacent end wall 35 of the slot 34, whereby said member 36 is effectively maintained against displacement.

Each of the bolsters B is adapted to be suitably anchored to the under surface of the forward end portion of a side member or beam 39 comprised in the frame or chassis of the semi-trailer T so that when the fifth wheel members 3 and 21 are in assembled relation, the trailer T is effectively hitched to the vehicle V.

The fifth wheel structure permits the requisite relative lateral movement between the vehicle V and the trailer T and irrespective of the extent of relative rotary movement between the members 3 and 21, the bolsters B provide for a vertical swinging movement of the trailer T so that irrespective of the unequalities or unevenness in the surface over which the connected vehicle and trailer may be traveling, it is assured that the supporting wheels W of the trailer will have the desired positive contact with the surface.

The particular arrangement of the fifth wheel structure is of essential advantage when it is necessary to have the vehicle V angularly related to the trailer T and under such conditions when the wheels W of the trailer T have contact with a surface below the surface upon which contact the drive or rear wheels D of the vehicle V.

The trailer T is provided with a transversely disposed brake shaft 40 provided with rock arms 41 with which are operatively engaged the rods 42 for controlling the brake mechanisms 43. A mechanism 43 coacts with each of the wheels W and is preferably of a well known internal band type now generally employed and in view of which fact it is believed that a detail description and illustration of such brake mechanism is unnecessary.

Extending upwardly from the shaft 40 is a rock arm 44 with which is operatively engaged a brake rod 45 extending forwardly of the trailer T. Secured to the forward end portion of the rod 45 is a flexible member 46 which extends over the pulley 28, through the tubular members 24 and 25 and under the roller 18 and extends forwardly for suitable connection with the brake shaft of the vehicle V so that when the brakes of the vehicle V are set, the brakes of the trailer T will also be applied at substantially the same time. By this arrangement, the brakes of the vehicle V and the trailer T are effectively under control of the driver of the vehicle V.

It will also be readily understood that by having the member 46 extend through the members 24 and 25, the relative rotation between the fifth wheel members 3 and 21 will in no way be obstructed or interfered with by said member 46 nor will the application of the brakes of the trailer be handicapped or obstructed when the trailer T is in different lateral positions with respect to the vehicle V.

The forward portion of the member 45, in practice, is adapted to be detachably engaged with the brake shaft of the vehicle V so that the desired connection may be readily obtained when the trailer T is hitched to the vehicle V or such connection detached when the trailer T is separated from the vehicle V.

From the foregoing description it is thought to be obvious that a hitch structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In a device of the class described, the combination with a motor truck and a trailer to be drawn thereby, of a fifth wheel section carried by the truck, a second fifth wheel section connected to the trailer, a hollow king pin member carried by the second section and passing through the aperture in the first section, means engaging the king pin member to lock the sections against displacement, a guiding device carried by the locking member and alined with the bore in the king pin member, and a flexible brake operating member passing over the guide and through the bore.

2. In a device of the class described, the combination with a motor truck and a trailer to be drawn thereby, of fifth wheel sections connecting the truck and trailer, a centrally bored king pin member carried by one of the sections, means for engaging the king pin member to lock the sections together, means for pivoting one of the sections to the trailer, guides carried by the lock and the pivoting means, and a flexible brake operating member passing over the guides and through the bore of the king pin member.

In testimony whereof I hereunto affix my signature.

JOHN Q. BLACK.